United States Patent

Apospors

[15] 3,665,592

[45] May 30, 1972

[54] CERAMIC PACKAGE FOR AN INTEGRATED CIRCUIT

[72] Inventor: Nick J. Apospors, Stamford, Conn.

[73] Assignee: Vernitron Corporation, Great Neck, N.Y.

[22] Filed: Mar. 18, 1970

[21] Appl. No.: 20,713

[52] U.S. Cl. .................................... 29/588, 29/590, 29/627, 174/DIG. 3

[51] Int. Cl. ......................................... B01j 17/00, H01l 1/10

[58] Field of Search ............. 174/DIG. 3; 317/101 A; 29/627, 29/589, 588, 590

[56] References Cited

UNITED STATES PATENTS

| | | | |
|---|---|---|---|
| 3,550,766 | 12/1970 | Nixen et al. | 174/DIG. 3 |
| 3,187,083 | 6/1965 | Grimes | 174/DIG. 3 |
| 3,495,023 | 2/1970 | Hessinger et al. | 174/DIG. 3 |
| 3,544,857 | 12/1970 | Byrne et al. | 29/627 |

*Primary Examiner*—John F. Campbell
*Assistant Examiner*—W. Tupman
*Attorney*—Edward H. Loveman

[57] ABSTRACT

A ceramic package for an integrated circuit includes a ceramic plate having a central recess. A screened circuit pattern of spaced conductive stripes of molybdenum manganese is applied to the plate and fired to metallize it. A coating of aluminum oxide is applied over the plate and parts of the stripes and a ring of molybdenum manganese is placed on the coating to surround the recess and inner ends of the stripes. The ring is metalized and then a "Kovar" ring is brazed to the metalized ring. An integrated circuit chip is placed in the recess and covered by a cover hermetically bonded to the ring.

3 Claims, 5 Drawing Figures

INVENTOR.
NICK J. APOSPOROS
BY
Edward H. Loveman
ATTORNEY

CERAMIC PACKAGE FOR AN INTEGRATED CIRCUIT

This invention concerns a ceramic integrated circuit package and the method of making the same.

It has been known heretofore to metallize a screened circuit on a ceramic plate. The metallized circuit is then covered with glass to protect the circuitry from loose foreign conductive particles. A metal ring is then hermetically sealed to the glass and a cover is then placed over the ring to enclose an integrated circuit which connects with the metallized screened circuit. This package has not been proven entirely satisfactory in applications where high temperature in the operating range of 600° to 700° C are encountered such as in some computer operations inasmuch as the glass melts and the hermetic seal is destroyed and a circuit failure follows.

The present invention is directed at solving this problem by avoiding the use of glass and employing only ceramic and metal. The invention involves coating a ceramic plate with molybdenum manganese to form a screened circuit pattern. Alumina (aluminum oxide) is spray coated over the circuit, excluding circuit terminals. A ring of molybdenum manganese is placed on the alumina and metallized and then a metallic ring is brazed in place. Terminal lugs are then brazed to terminals of the screened circuit. The assembly is now ready to receive an integrated circuit chip and soldering of a cover to the ring. This assembly is capable of withstanding ambient temperatures as high as 700° C which is well in excess of any operating temperature which will be encountered.

Accordingly, it is a primary object of the present invention to provide a ceramic package for an integrated circuit which is capable of withstanding ambient temperatures of 700° C.

Another object of the present invention is to provide a ceramic package for an integrated circuit employing only ceramic and metal.

These and other objects and many of the attendant advantages of this invention will be readily appreciated as the same becomes understood by reference to the following detailed description when considered in connection with the accompanying drawings, wherein FIG. 1 is a perspective view of a ceramic plate at the start of the process embodying the invention.

Figures 1, 2, 3, 4, 5:
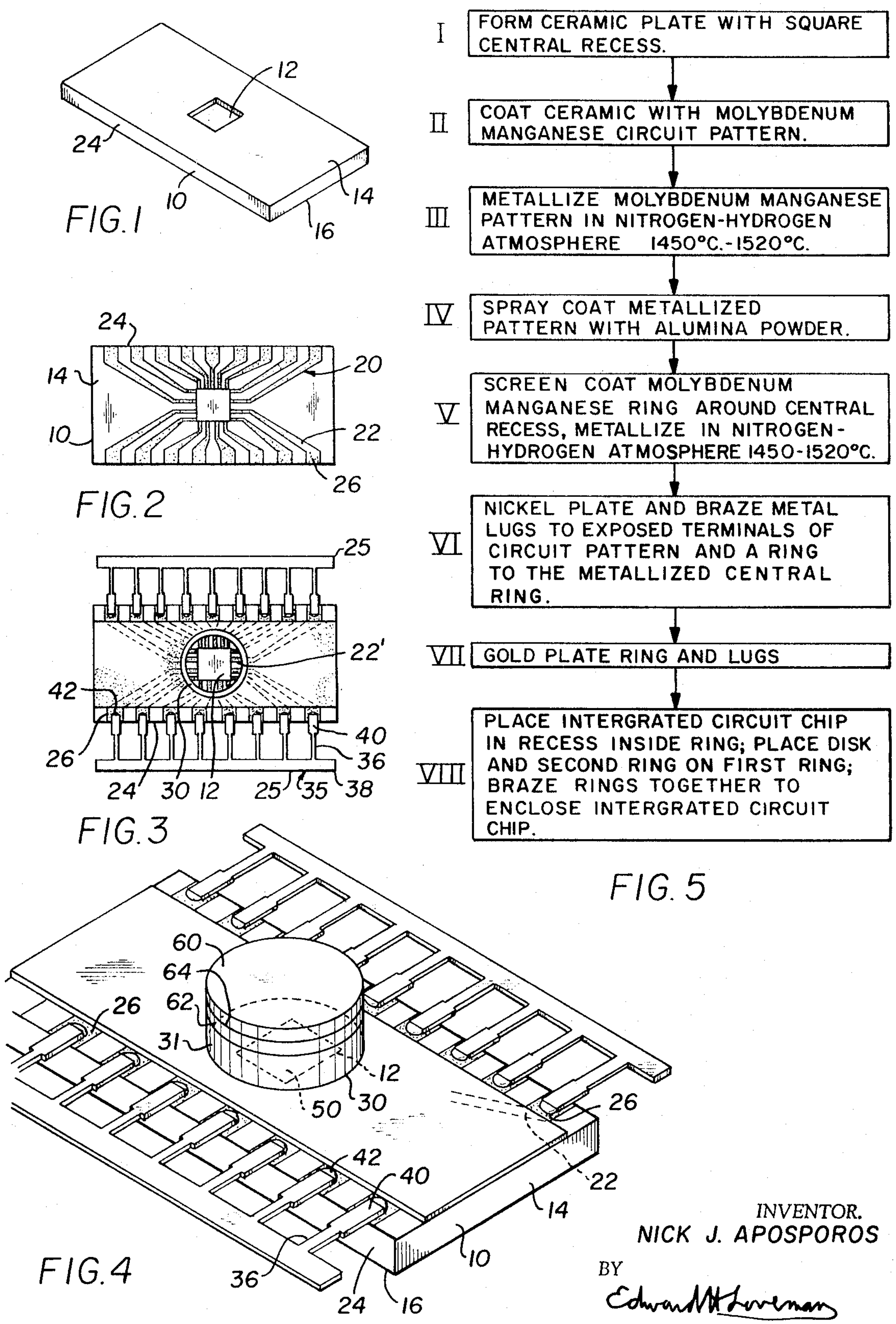
FIG. 2 is a top plan view of the ceramic plate at a further stage of the process.
FIG. 3 is a top plan view of a circuit assembly at a further stage of the process.
FIG. 4 is an enlarged fragmentary perspective view of part of the assembly of FIG. 3.
FIG. 5 is a flow chart of the steps involved in the process according to the invention.

Referring now to the drawings wherein like reference characters designate like or corresponding parts throughout the several views, there is shown in FIG. 1 a flat, rectangular, ceramic plate 10. This plate contains primarily alumina. It is fired to set it in the rigid form shown in FIG. 1. A rectangular recess 12 is formed in the center of the plate extending down from its upper surface 14 but terminating short of its bottom side 16. The formation of the plate is indicated as Step I in the flow chart of FIG. 5.

A screened circuit pattern 20 consisting of molybdenum manganese is then screen coated upon a surface 14. This is Step II in FIG. 5. The circuit pattern comprises a multiplicity of laterally spaced conductive stripes 22 which extend from outer edges 24 inwardly to edges of recess 12. Terminal portions 26 of the stripes are rectangular and extend up to edges 24.

The coated plate is then fired in the range of 1,450° C–1,520°Φ~ C in an atmosphere of hydrogen and nitrogen gases until the screened circuit pattern metallizes. This is Step III indicated in FIG. 5.

The surface 14 and metallized circuit pattern 20 are now spray-coated with powdered alumina (aluminum oxide). Inner ends 22′ (FIG. 3) of stripes 22 at recess 12 and outer portions 26 are left uncoated. This is Step IV.

A ring 30 of molybdenum manganese is screen-coated to surround recess 12 and then metallized in the range of 1,450° C. – 1,520° C. in a wet atmosphere of nitrogen and hydrogen gases thereby simultaneously curing the aluminum oxide which was spray coated in Step IV. This is Step V in the process.

The outer portions 26 and the inner ends 22′ (FIG. 3) of stripe 22 at recess 12 and the ring 30 are then nickel-plated. A pair of frames 25 each having a plurality of spaced conductive leads connected to a common bar 38 and terminating in lugs 40 are then brazed to the circuit pattern. Lugs 40 overlay termination portions 26 and are secured by braze material 42. A metal ring 31 is also brazed into place on the nickel-plated ring 30. This is Step VI.

Ring 31, terminals 26 and lugs 40 are then gold plated to prevent them from corroding. This is Step VII.

The assembly 10′ shown in FIG. 3 is now ready for final processing. An integrated circuit chip 50 is placed in recess 12. Terminals of the circuit on chip 50 contact inner ends 22′ of conductive stripes 22 inside ring 30. A ceramic disk 60 to which is bonded a metal ring 62 is then placed over chip 50. Ring 62 is secured to ring 31 by braze 64. This construction is shown in FIG. 4. This is Step VIII set forth in FIG. 5. and completes the packaging process. Bars 38 will be removed or may be left connected in part to certain lugs 40 to bridge them electrically.

The complete package will safely withstand operating or ambient temperatures as high as 700° C. and even higher. The braze 42 and 64 must of course have a very high melting point to maintain the hermetic seal of the chamber defined between disk 60, rings 31, 62, and plate 10.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

I claim:

1. A method for making a package assembly for an integrated circuit, comprising the steps of forming a ceramic plate having a recess in one side thereof;

applying a screened circuit pattern of spaced strips of molybdenum manganese to said one side of the plate, said strips extending between at least one edge of the plate and the perimeter of said recess;

bonding said pattern by firing at an elevated temperature; spray coating said one side of the plate and portions of said stripes between inner and outer ends thereof with aluminum oxide powder;

applying a screen coat of molybdenum manganese to said aluminum oxide powder in a ring surrounding said recess; and metallizing said ring of molybdenum manganese in a range of 1450° C – 1520° C thereby curing said aluminum oxide coating, and hermatically sealing said ring thereto.

2. A method as defined in claim 1, comprising the further steps of bonding a metallic ring to said molybdenum manganese ring and bonding circuit terminal lugs to the outer ends of said stripes and plating said lugs, ends of the stripes, and said metallic ring with a noncorrosive metal.

3. A method as defined in claim 2, comprising the further steps of placing an integrated circuit chip in said recess with the terminals of the integrated circuit chip contacting terminals in said recess whereby the terminals of the integrated circuit are electrically continuous with the inner ends of said strips inside said metallic ring;

placing a ceramic disk having another metallic ring bonded to it over the first named ring; and bonding the two rings together to enclose said chip in a hermetically sealed chamber.

* * * * *